(12) United States Patent
Selivanov et al.

(10) Patent No.: US 12,014,462 B2
(45) Date of Patent: Jun. 18, 2024

(54) GENERATION OF A 3D MODEL OF A REFERENCE OBJECT TO PERFORM SCALING OF A MODEL OF A USER'S HEAD

(71) Applicant: Ditto Technologies, Inc., Oakland, CA (US)

(72) Inventors: Oleg Selivanov, San Mateo, CA (US); Trevor Noel Howarth, San Francisco, CA (US); Amruta Rajendra Kulkarni, Fremont, CA (US)

(73) Assignee: DITTO TECHNOLOGIES, INC., Oakland, CA (US)

( * ) Notice: Subject to any disclaimer, the term of this patent is extended or adjusted under 35 U.S.C. 154(b) by 56 days.

(21) Appl. No.: 17/736,010

(22) Filed: May 3, 2022

(65) Prior Publication Data

US 2022/0351467 A1 Nov. 3, 2022

Related U.S. Application Data

(60) Provisional application No. 63/183,396, filed on May 3, 2021.

(51) Int. Cl.
| | |
|---|---|
| *G06T 7/73* | (2017.01) |
| *G06T 7/55* | (2017.01) |
| *G06T 17/20* | (2006.01) |
| *G06T 19/20* | (2011.01) |
| *G06V 40/16* | (2022.01) |

(52) U.S. Cl.
CPC .......... *G06T 17/20* (2013.01); *G06T 7/55* (2017.01); *G06T 7/74* (2017.01); *G06T 7/75* (2017.01); *G06T 19/20* (2013.01); *G06V 40/171* (2022.01); *G06T 2219/2004* (2013.01); *G06T 2219/2016* (2013.01)

(58) Field of Classification Search
None
See application file for complete search history.

(56) References Cited

U.S. PATENT DOCUMENTS

| | | |
|---|---|---|
| 2013/0176345 A1 | 7/2013 | Kim et al. |
| 2014/0293220 A1 | 10/2014 | Kornilov et al. |

(Continued)

OTHER PUBLICATIONS

Internation Search Report and Written Opinion of PCT Application No. PCT/US2022/027524 dated Aug. 12, 2022.

*Primary Examiner* — Nicholas R Wilson
(74) *Attorney, Agent, or Firm* — H&I PARTNERS; C. Andrew Im; Chai Im

(57) ABSTRACT

Methods and systems herein can include a processor configured to obtain a set of images that shows a user's head and a reference object, generate a user's head model of the user's head based at least in part on the set of images, and generate a reference object model of the reference object based at least in part on the set of images. The processor can further be configured to determine an orientation and a size of the reference object model based at least in part on a relative location of the reference object relative to the user's head in the set of images and use the reference object model, the orientation of the reference object model, the size of the reference object, and a known dimension of the reference object to determine scaling information. The processor can then be configured to apply the scaling information to the user's head model to obtain a scaled user's head model. The system can also include a memory coupled to the processor and configured to provide the processor with instructions.

17 Claims, 6 Drawing Sheets

(56) References Cited

U.S. PATENT DOCUMENTS

| | | |
|---|---|---|
| 2017/0242277 A1 | 8/2017 | Barton |
| 2019/0332852 A1 | 10/2019 | Li et al. |
| 2020/0105007 A1 | 4/2020 | Song et al. |

GENERATION OF A 3D MODEL OF A REFERENCE OBJECT TO PERFORM SCALING OF A MODEL OF A USER'S HEAD

CROSS-REFERENCE TO RELATED APPLICATIONS

This application claims priority to U.S. Provisional Patent Application No. 63/183,396 filed on May 3, 2021, the disclosure of which is incorporated herein, in its entirety, by this reference.

BACKGROUND

Scaling a user's body, and more particularly the user's head, is routinely performed for virtual try-on environments where products are fitted to a virtual representation of the user for evaluation and selection. Such a model can be used to determine the appropriate fit of spectacles for patients. A person seeking to buy glasses has traditionally needed to go in person to an optometrist or an eyewear store and try on several glasses frames to gage their fit and finish. Typically this requires a few hours of browsing through several rows of glasses frames and trying on many pairs of glasses frames, most of the time without prior knowledge of whether a particular glasses frame fits or not. Although glasses frames are designed to fit most people, not all heads are the same size, and therefore not all glasses will fit a person. Additionally, glasses frames not only have the functional purpose of correcting the wearer's vision, but also have an aesthetic purpose, which adds other factors to consider during the selection process.

When considering fit and finish, the ability to accurately scale the user's virtual head and the product is fundamental to an efficient and accurate experience. What is needed is a way to fit glasses frames to people more efficiently. Thus, users and manufacturers of vision-corrective lenses continue to seek new and improved devices, systems, and methods to improve the fit of prescription lenses to a patient.

SUMMARY

Embodiments disclosed herein are related to generating a model of a reference object to perform scaling of a model of a user's head. In one example, a system can include a processor configured to obtain a set of images of a user's head and a reference object. The processor can generate a model of the user's head based at least in part on the set of images and generate a model of the reference object based at least in part on the set of images. In some examples, the processor can be configured to determine an orientation and a size of the reference object model based at least in part on a relative location of the reference object relative to the user's head in the set of images, and use the reference object model, the orientation of the reference object model, the size of the reference object, and a known dimension of the reference object to determine scaling information. Further, the processor can be configured to apply the determined scaling information to the model of the user's head to obtain a scaled version of the model of the user's head. The system can also include a memory coupled to the processor and configured to provide the processor with instructions.

In some examples, the set of images includes a first set of images, and wherein the processor is further configured to receive a second set of images that shows the user's head but not the reference object, and wherein the user's head model is further generated based at least in part on the second set of images. In some examples, the reference object is associated with a standard size or known dimensions. Determining the orientation of the reference object model can include generating a facial feature model of a portion of the user's head corresponding to the location of the reference object relative to the user's head in the set of images, and determining the orientation of the reference object model using the facial feature model of the portion of the user's head.

In some examples, the processor can be further configured to determine a location of the reference object in at least one image of the set of images. The processor can be further configured to determine a key facial point in at least one image of the set of images. In some examples, the user's head model and the reference object model are in the same coordinate system.

In some examples, the processor can be further configured to place a glasses frame model on the scaled user's head model and use stored measurement information associated with the glasses frame model and the placement of the glasses frame model on the scaled user's head model to determine a set of facial measurements associated with the user's head. In some examples, the processor can be further configured to determine a respective confidence level or classification of accuracy corresponding to at least one facial measurement.

In some examples, the processor can be further configured to compare the set of facial measurements to stored dimensions of a set of glasses frames and output one or more recommended glasses frames at a user interface based at least in part on the comparisons. In some examples, the processor can be further configured to input the set of facial measurements to a machine learning based model to obtain a set of recommended glasses frames and output the set of recommended glasses frames at a user interface.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the present disclosure, wherein identical reference numerals refer to identical or similar elements or features in different views or embodiments shown in the drawings.

DETAILED DESCRIPTION

Figure 1A:
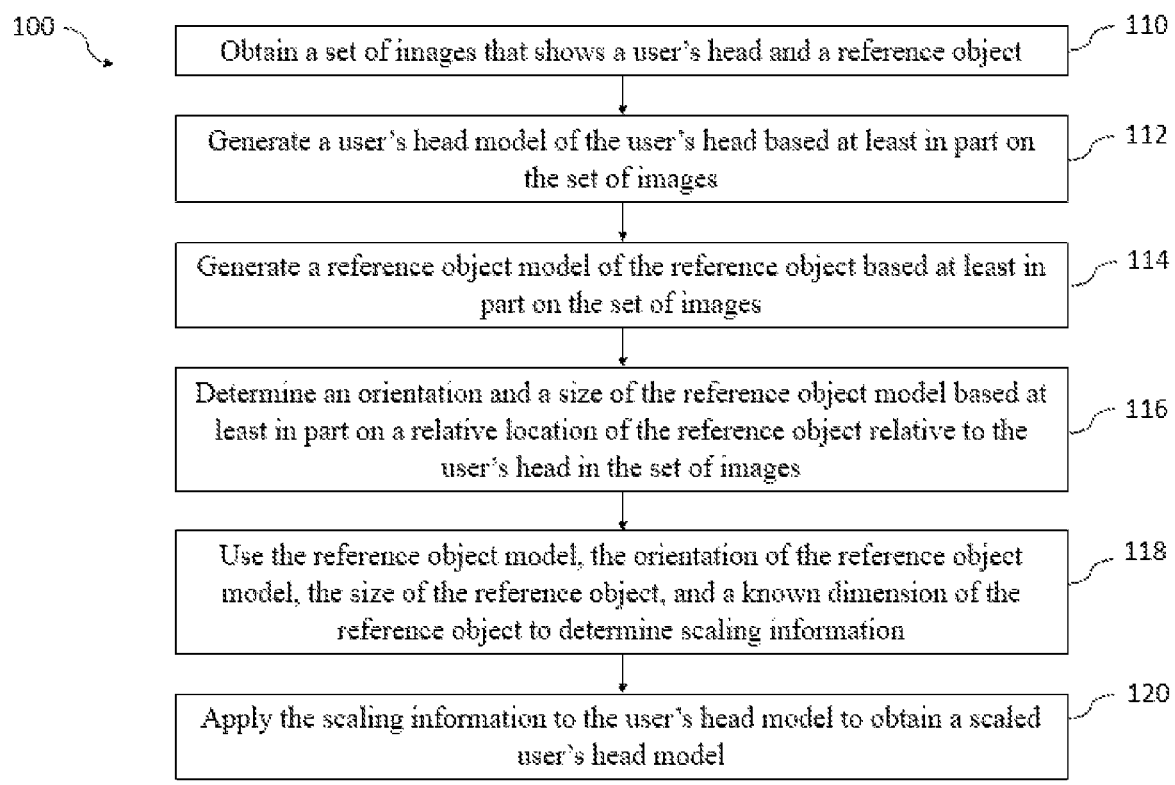
FIG. 1A is a flow diagram of a method for selecting glasses frames that fit a user's head, according to an embodiment.

Embodiments disclosed herein are related to generating a model of a reference object to perform scaling of a model of a user's head. While the present exemplary systems and methods are described in the context of scaling a user's head in connection with the virtual try-on of spectacle frames, the teachings and methods disclosed herein can be appropriately used in connection with scaling any number of body-parts or features, and can be used in connection with the try-on of any number of products. As used in connection with the try-on of spectacles, many users of corrective lenses are required to adjust their prescription lenses, such as eyeglasses, because of several factors. Embodiments of the present disclosure relate to systems and methods used to obtain measurements and an accurate model of a user's head, or other body part, using a system that doesn't inconvenience the user.

As used herein, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Typical methods for determining a scale to be applied to a model of a user's head based on an image that shows the user holding a standard sized card over his/her face in the image may not be as accurate as desired. The captured image can only hold two-dimensional information, so the true size and orientation of objects in the image, including that of the standard sized card, cannot be ascertained. Because a standard sized card (such as a credit card) will appear to have a different size in an image depending on its tilt or orientation. Consequently, comparing the apparent size of the card in the two-dimensional image to an apparent size of the user's head may not be accurate enough to correctly scale a model of the user's head.

Some of the measurements used for ordering prescription glasses such as pupillary distance (which is sometimes referred to as "PD") and segment height need accurate scale determination, which may not be offered by analyzing a 2D standard sized card in an image. Ideal accuracy for PD for ordering high prescription glasses is +/−1 mm and this level of accuracy can easily be degraded due to any tilt introduced to the standard sized card by the user holding it; as well as any tilt of the user's head relative to the position of the card. Additionally, measurements such as segment height, which includes a measurement form the bottom of the lens to the center of the pupil, requires accurate placement of the glasses on the user's head in three-dimensions (3D). The determination of the segment height cannot be achieved by a simple 2D image-based approach. Consequently, a more accurate technique for determining measurements along a user's head is needed. Examples of generating a 3D model of a reference object to interpret its orientation and to perform subsequent scaling of a model of a user's head are described herein.

FIG. 1A is a flow chart illustrating a method for selecting glasses frames that fit a user's head. In some examples, the method is performed by a system including a processor. The processer can be configured to perform the method. At step 110, a set of images are obtained that show a user's head and a reference object (e.g., a standard size card). In other words, on an image of a user's head, the image also shows a standard sized card, and the system then detects the locations of some features of the card (e.g., a lower card corners). The reference object can be held at an instructed and/or predetermined location relative to the user's head. In some examples, predetermined locations at which the user can be instructed to place the reference object can be over the user's forehead or below the user's nose. In some examples, at 110, a video or a plurality of video frames of the user's head can be received. In some embodiments, the video can include the user doing a head turn (e.g., in at least one direction relative to the frontal image facing the camera). At step 112, a user's head model is generated using, at least in part, the set of images obtained in step 110. In some embodiments, at step 112, the user's head model can be generated from a video or a plurality of video frames. At step 114, a reference object model can also be generated. The reference object model is generated based, at least in part, on the reference object shown on the set of images. At step 116, the system determines an orientation and size of the reference object based at least in part on a relative location of the reference object relative to the user's head in the set of images.

Using the known physical dimensions (e.g., length and width) of the standard sized card and the detected points of the user's head feature(s), a scale coefficient can be calculated. In some examples, at step 118, the system can use the reference object model, the orientation of the reference object model, the size of the reference object, and a known dimension of the reference object to determine scaling information. For example, where the reference object is a credit card, the scaling ratio can be determined by dividing the determined width of the credit card 3D model by the known physical card width of the credit card. Then, the scaling ratio can be applied to the user's 3D head model to scale the 3D model of the user's head to the real-life dimensions of the user's head.

In various examples, all orientations are determined relative to the camera capturing the images. In various examples, the orientation of the user's 3D head model to the camera is known. As such, after the orientation of the reference 3D object model relative to the camera is determined, the orientation of the reference 3D object model to the user's 3D head model can also be determined. Both the orientation to the camera and to the 3D head are used as part of the optimization process described in greater detail below. At step 120, the system can apply the scaling information to the user's head model to obtain a scaled user's head model.

In other words, the inputs to the system can include at least a set of images with the user's head and a reference object. Optionally, a set of images with a user's head without the reference object can also be included. In some examples, the system for generating a 3D model of a reference object then performs at least the following: (1) generates a 3D model of the user's head using the available input images, (2) detects the 2D location of the reference object in at least one of the images with the reference object. For example, if the reference object were a standard sized credit card, then in order to detect the credit card's location, the four corners of the credit card can be detected in a given image, (3) the relative location of the reference object and the user's head is known because the user had been instructed to place the reference object at a particular/predetermined area relative to the user's head. For example, the user is instructed to put the reference object on his/her forehead or under the nose (and over the lips). It can be advantageous to restrict the relative location of the reference object with respect to the user's head so that the known location of the reference object relative to the user's head will result in an accurate reconstruction of the two objects in 3D space. This exemplary process accounts for the fact that there is always a degree of freedom such as one of the objects being bigger or closer to the camera.

In various embodiments, a 3D (e.g., mesh) model of the user's head can be generated in 3D space together with a 3D (e.g., mesh) model of a reference object (of a standard size and/or of known dimensions) with the correct orientation. For example, the reference object can be a compact disk (CD) or a standard sized card (e.g., a credit card or a library card). To generate a 3D model of the user's head together with a 3D model of the reference object with the correct orientation, in various embodiments, a set of head turn images of a user's face can be obtained together with a set of images where the user holds the reference object over his/her face. By combining the information in all these images, an accurate 3D model for the user's head, the orientation of the user's head in each image, and also the 3D model of the reference object with the correct orientation can be generated. In some examples, the head turn images and the reference object image are not required to be collected at the same time. However, in some examples, lighting changes across the images captured at different times, or other similar factors can have an impact on the accuracy of the determined 3D models and the orientation.

According to one exemplary embodiment, the reference 3D object model is reconstructed using a special form of a loss function in reconstruction optimization (or a trained neural network/other approach) that would penalize the reference object the further that it is removed from the user's forehead (or another predetermined location relative to the user's head that the user was instructed to place the reference object). For example, assume that the user was instructed to place the reference object, a credit card, on her forehead. In one example process, a facial feature model (e.g., a 3D sphere) can be fitted on the forehead region on the user's 3D head model and then an optimization process can be used to find the correct orientation for the credit card 3D model such that the credit card is required to touch the surface of the sphere for proper placement. According to this exemplary modeling sequence, the following is a specific example process by which to fit a facial feature model (a 3D sphere in this specific example) to the forehead region of the user's 3D head model when it is known that the reference object is placed over the user's forehead: The center and radius of a 3D sphere are determined so that the surface of the sphere best coincides with the surface of the head model near the forehead. In more technical terms, a 3D sphere is fitted to a set of 3D points sampled from the user's forehead to minimize the distance between the surface of that sphere and the sampled 3D points. It is known that the card should lay against the forehead, but it makes the calculation easier to determine whether the card lays against the sphere than the actual user's head 3D head model. An optimization process can be used to find the scale/orientation of the card so that the corners of the card line up well with the card corners detected in the image and the card is as close as possible to laying against the sphere (which acts as a proxy for the forehead). In some embodiments, the size (or width) of the reference object is directly used to determine the scaling ratio. However, without knowing the orientation of the reference object (for example if the reference object were tilted relative to the camera and the tilt were not known, the reference object would appear to not be as wide as it really is) it is difficult to accurately determine the size of the reference object. As such, in various embodiments, both the size and orientation of the reference object are determined simultaneously to make sure the size accurately takes into account the tilt of the reference object.

Figure 1B:
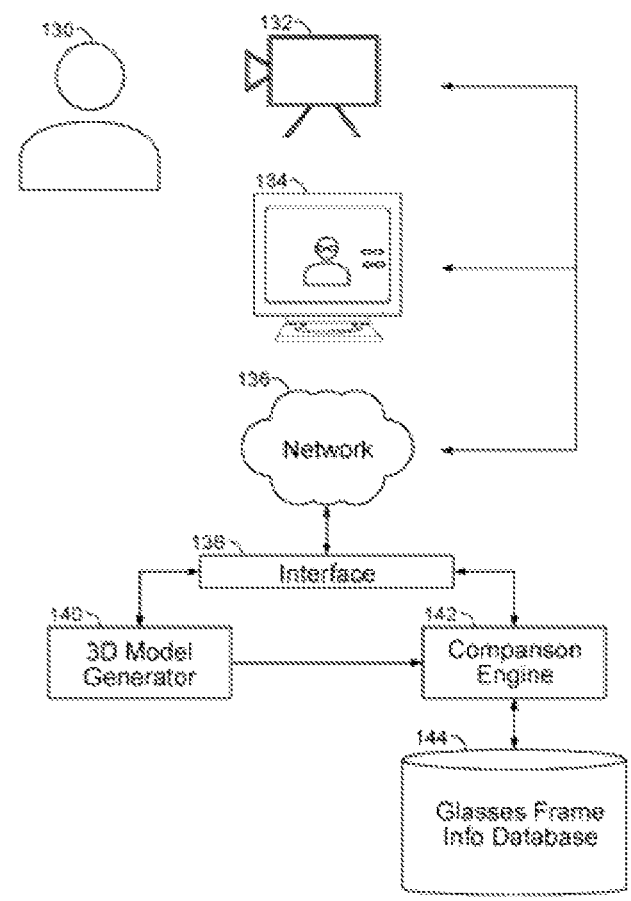
FIG. 1B is a diagram illustrating an example of a system for selecting glasses frames that fit a user's head, according to an embodiment.

FIG. 1B is a diagram illustrating an example of a system for selecting glasses frames that fit a user's head. User 130 is in front of a camera 132 or webcam in communication with a system having a processor that is running an application that captures video frames and/or images of the user's head. In some embodiments, the captured video frames and/or images are transferred through a network 136 (e.g., WIFI, cellular, Bluetooth, a wireless transmission system, or a local area network). An interface 138 receives the video frames and/or images. In some embodiments, the application capturing the video frames/images or fitting glasses to the user, or portions of the application, is executed on one or more processors and can be located at the client or on the server or a combination of the client and server. In some examples, the camera 132 and the computing device 134 can be separate elements or can be an integrated device such as a smartphone, a tablet, a laptop, a desktop computer, or any other computing device including a camera. Additionally, while illustrated in FIG. 1B as transmitting the captured images and data across a network 136 to processing devices, it will be understood that the computing and model generating can, in some examples, be performed locally by the computing device 134.

Returning to FIG. 1B, the 3D model generator 140 can determine the user's head measurements and a three-dimensional (3D) model from the video/images received of the user's head at different angles. The 3D model can include one or more of the following: images/video frames of the user's head, reference points on the user's head, user head measurements, and a set of rotation/translation matrices. In some examples, the 3D model contains only reference points associated with the user's head. In some examples, an initial 3D model is first obtained from a subset of the received video frames/images. Then the initial 3D model can be adjusted into an adjusted 3D model using an iterative algorithm incorporating additional information from the received video frames/images.

In some examples, the images are captured at the client computer and sent over the internet to a server to process the images and create a 3D model of the user's head. In some embodiments, the client computer can create the 3D model of the user's head and send the 3D model over a network (such as the internet) to select glasses that fit the user. Other embodiments with different tasks being executed by different processors or different locations are also included in the scope of the present exemplary system and method. In some examples, a scaling reference is captured with the user's head when obtaining video and/or images at step 110 of FIG. 1A. For example, the user is instructed to hold a scaling reference to the user's head and an image is captured of the user with the scaling reference in order to properly scale the user's head measurements and fit glasses frames to the user. In some examples, the scaling reference is a measurement in standard units of something in the video frame/image (for example a pupillary distance), that is entered by the user. In some embodiments, the camera is calibrated using the video/images captured of the user with or without the scaling reference. Comparison engine 142 compares the user head measurements from the 3D model to a database of glasses frame information 144. In some examples, one or more glasses frames can be selected based on a fit score computed by the system.

In some embodiments, the glasses frame information includes a fit score. In some examples the one or more glasses frames determined to match a user are displayed in a list or ordered list associated with the fit score and/or one or more other attributes associated the user and/or the glasses frames in the list. In some embodiments, the at least one of the selected glasses is rendered on an image associated with the user. In some examples, at least one of the selected glasses is rendered on a 3D interactive model of the user. This allows the user to visualize how the user looks with a selected pair of glasses. In some embodiments, this allows the user to more easily decide to purchase a pair of glasses without having to visit a physical store.

Figure 2A:
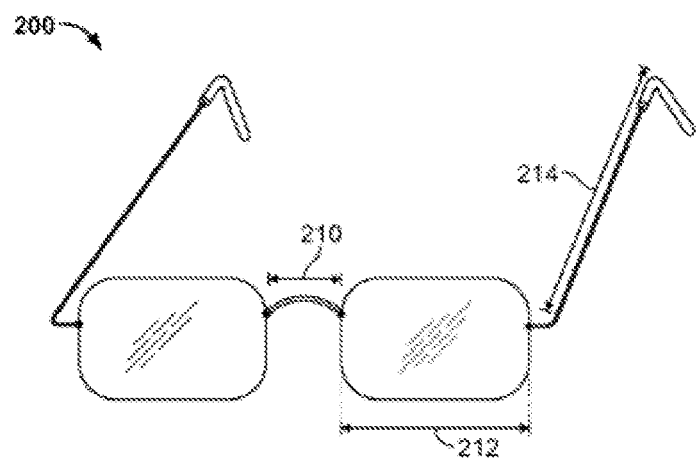
FIG. 2A is a diagram illustrating an example of relevant measurements of a glasses frame, according to an embodiment.

FIG. 2A is a diagram illustrating an example of relevant measurements of a glasses frame. Glasses frame 200 can be measured to obtain relevant distances of a glasses frame. In some examples, the relevant distances are bridge length 210, lens diameter 212, and temple distance 214. In some embodiments, the overall frame width (which is not shown in the example) is also measured. The bridge length 210 is the distance between the two lenses of the glasses frame. The lens diameter 212 is the diameter of one of the lenses. The temple distance 214 is the length of the glasses frame arm from the corner of the lens to the bend on the temple tips, which goes over the user's ear. In other embodiments, other distances can be measured from the glasses frames. In various examples, other ways of expressing the distances, for example, positions of endpoints of each of the distances in a 3D coordinate system, length and offset from a common origin, or an array of points representing each line of the glasses can be stored.

Figure 2B:
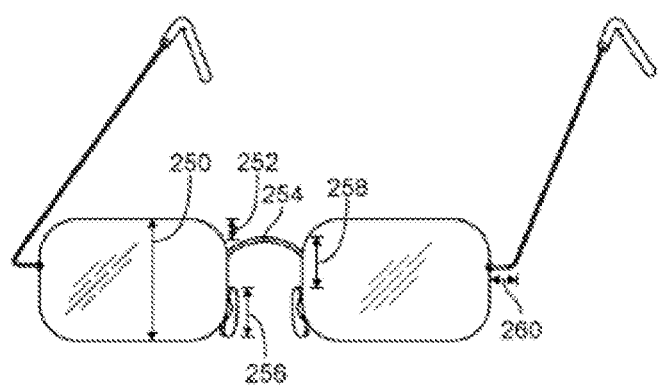
FIG. 2B is a diagram illustrating an example of other relevant measurements of a glasses frame, according to an embodiment.

FIG. 2B is a diagram illustrating an example of other relevant measurements of a glasses frame. Other relevant measurements of the glasses frame comprise lens height 250, vertical lens offset 252, bridge apex position 254, bridge height, nose pad length and position 256, nose pad vertical offset 258, and end piece offset and end piece length 260.

The measurements of the glasses frames include a portion of the glasses frame information stored in a database. In some examples, glasses frames are measured and the measurements are stored in a database. In some examples, a 3D model of each glasses frame is stored in the database. In some examples, the glasses frames are scanned with a 3D imager and are stored in the database. In some examples, other glasses frame information can be stored in the database, including one or more of the following: glasses frame measurements, identifier, name, picture, manufacturer, model number, description, category, type, glasses frame material, brand, part number, and price.

Figure 3:
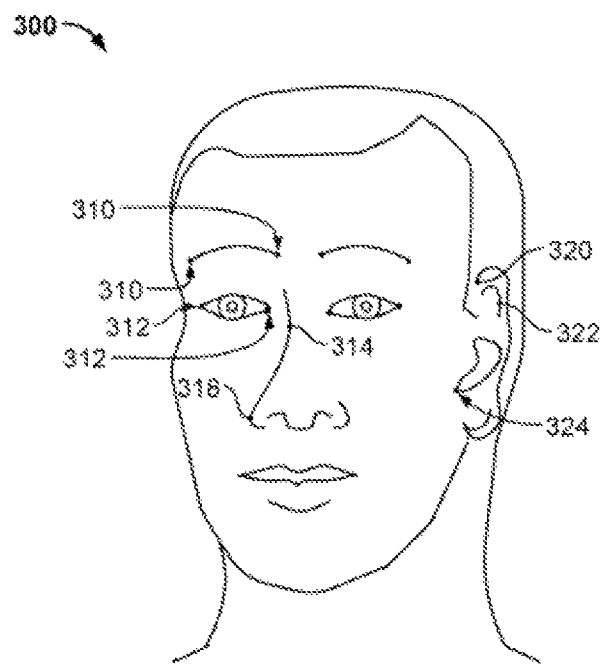
FIG. 3 is a diagram of an example set of reference points on a user's head, according to an embodiment.

FIG. 3 is a diagram of an example set of reference points on a user's head 300. The reference points are used to determine user head measurements. For example, the endpoints of the user's eyebrow 310, endpoints of the user's eye 312, bridge of the user's nose 314, tip of the user's nose 318, the top point where the helix (the rounded top edge of the ear) joins the head 320, the middle of the antihelix 322 (the flatter lump inside of the helix of the ear), and the bottom of the user's intertragus notch 324 are the reference points obtained from the video frames and/or images. In some embodiments, the reference points are used in calculating the user's head measurements and are a portion of the 3D model of the user's head. Other reference points and other measurements can be obtained from the video frames and/or images of the user's head. For example, other relevant reference points include the midpoint between the user's eyes, the left and right cheekbones, the highest point of the ear lobe or other reference points on a user's head. In some embodiments, a subset of the reference points listed is used. In some embodiments, other reference points of the user's head are used.

Figure 4:
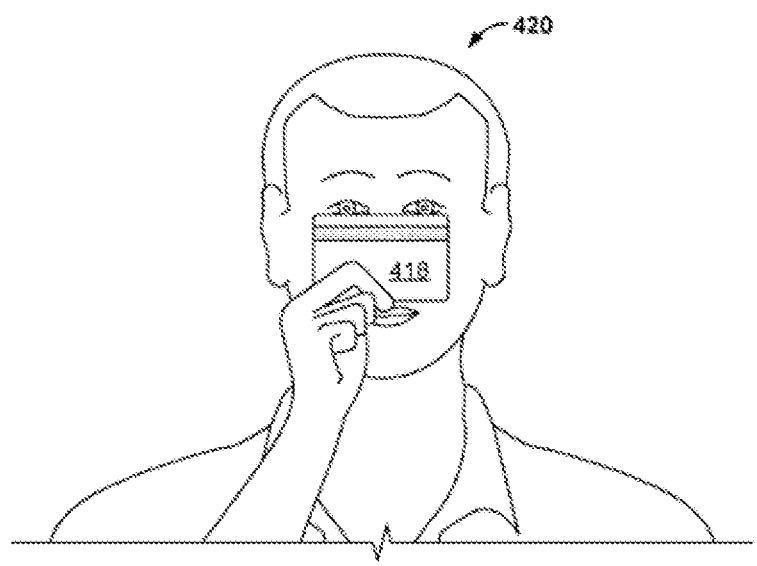
FIG. 4 is an example of a reference object needed in order to properly scale the images and/or video frames of the user's head to properly fit the glasses, according to an embodiment.

FIG. 4 is an example of a scaling reference needed in order to properly scale the images and/or video frames of the user's head to properly fit the glasses, according to an embodiment. For example, a credit card-sized object 418 is held up to the user's head 420 for scaling. During the process of generating the 3D model, the user is instructed to hold the credit card-sized object to the user's face. A camera or webcam directed at the user can then capture a short video or an image of the user with a credit card next to their face. In some embodiments, the credit card-sized object is held on or near various places, for example the bridge of the user's nose. In some embodiments, the scaling reference is a pattern of a predefined physical size displayed by an object such as, for example, a smartphone. In some embodiments, the scaling reference is a measurement in standard units of something in the video frame/image (e.g., a pupillary distance) and can also be provided by the user. In some embodiments, a different scaling reference object with a standard and known measurement is used. For example, a coin (e.g., a quarter) can be held next to the user's eye. Where the user is instructed to place the reference object in a location relative to a portion of the user's head other than over the forehead (e.g., below the nose), a similar approach may be used to generate an appropriate facial feature model as a proxy for the portion of the user's head.

Note that this reference 3D object model reconstruction is now in the same coordinate system as the user's 3D head model reconstruction. The reference 3D object model reconstruction being in the same coordinate system as the user's 3D head model reconstruction means that both 3D models can be considered at the same time and reconstructed not only in relation to the objects themselves, but also to where each object lies in space relative to the other object. Rather than just reconstructing the shape of the head and the shape of the reference object independently, the user's head's and the reference object' shapes are reconstructed as well as the relative size, orientation (rotation) and location (translation) of each 3D model to best match the input images. Put another way, the physical real world shape and positioning of the objects with respect to each other are replicated together. The 3D model of the reference object is generated in the way that the user is holding it in real life. Because the models of the reference object and the user's head are reconstructed are in the same coordinate system, once the scale is determined for one of them, then the scale for the other one can also be determined.

In some examples, in order to generate the 3D model of the reference object in 3D space and calculate the single or dual pupillary distance (PD) for the user, some key points are determined from (e.g., one of) the 2D images where the user is holding the reference object. For example, where the reference object that the user is holding is a credit card, the key points are card corners and the iris centers of the user. In some embodiments, neural networks can be customized and the standard models can also be modified to best perform in the context of facial and card landmark detection. As used herein, the uses of neural networks can include any number of algorithms used in deep learning, including, but in no way limited to, convolutional neural networks (CNNs), long short term memory networks (LSTMs), recurrent neural networks (RNNs), generative adversarial networks (GANs), radial basis function networks (RBFNs), multilayer perceptron (MLPs), self-organizing maps (SOMs), or deep belief networks (DBNs), and the like. In some embodiments, the key points of the reference object and those of the user's head from the 2D image(s) are determined by inputting the image(s) into a machine learning model (e.g., neural networks) that has been trained on a high number of images for which the locations of reference object key points and user head landmarks are labeled by human markup. The key points are used to help determine the orientation of the reference object to the camera. Specifically, a 3D point on the reference object is known to correspond to each of the detected key points in the 2D image. The reference object can be oriented relative to the camera so that each 3D point on the reference object lines up ("projects to") the corresponding detected 2D key point in the image. It should be noted that lining up the key points alone is not enough to determine the size or orientation of the reference object (in most cases there is more than one way to orient the card so it lines up with the key points detected). This is why, in some embodiments, the user can be instructed to touch the reference object to the user's forehead so that this information is used to determine the orientation/size of the reference object.

Once the user's 3D head model is scaled to real-life dimensions using the scaling ratio determined with the reference 3D object model, in some embodiments, facial measurements can be calculated by leveraging a fitting approach where 3D models of one or more glasses frames are placed on the scaled user's 3D head model.

Figure 5:
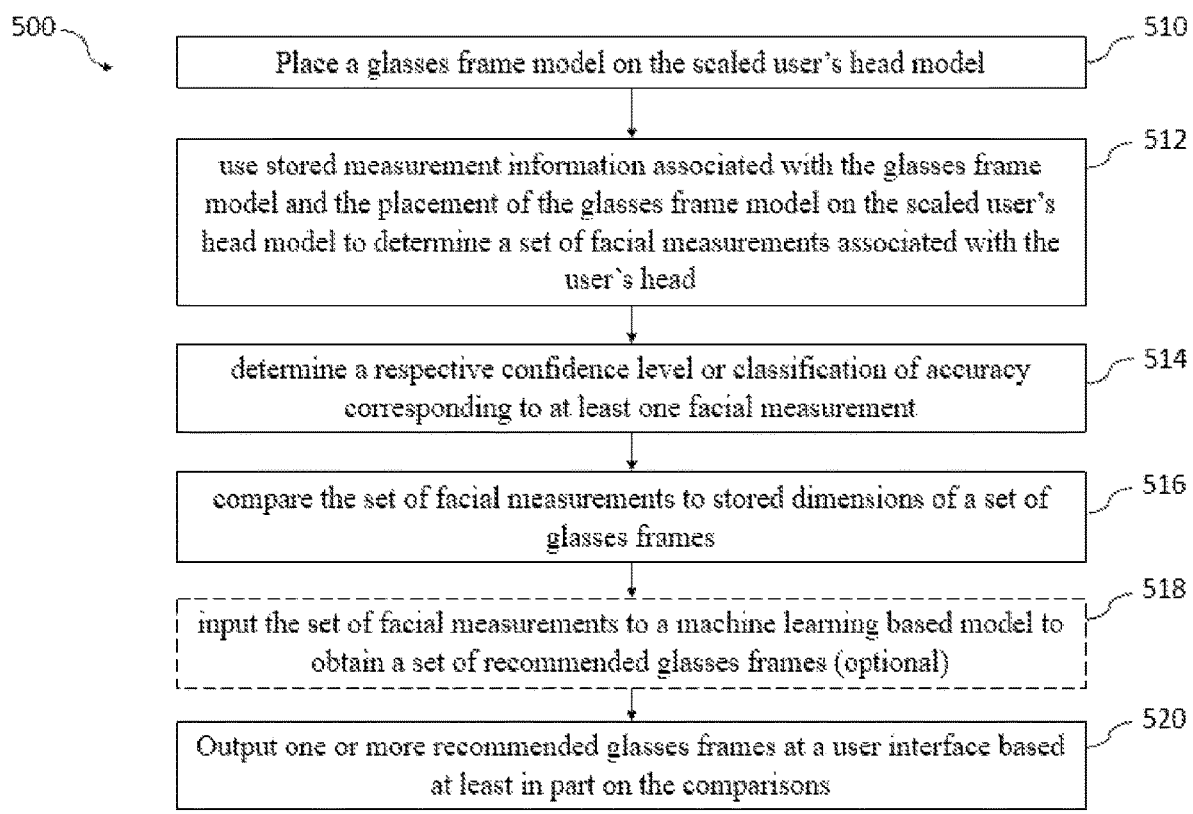
FIG. 5 is a flow diagram for a method to determine a set of facial measurements associated with the user's head, according to an embodiment.

FIG. 5 is a flow diagram for a method 500 to determine a set of facial measurements associated with the user's head, according to an embodiment. At step 510, a database of digital glasses frames with accurate real-life dimensions can be maintained and one or more of the glasses frames can be fitted on the scaled 3D model of the user's head. The glasses frame model can be placed on the scaled user's head model. At step 512, after the placement of a 3D model of a glasses frame onto the scaled 3D model of the user's head, facial measurements such as, for example, segment height, temple length, single/dual PD, face width, and nose bridge width of the scaled 3D model of the user's head can be calculated based on the (fitted) placement of the 3D model of the glasses frame on the scaled 3D model of the user's head. In some embodiments, to measure singe/dual PD, the location of the pupils of the user's 3D head model is used. In some embodiments, the location of the pupils of the user's 3D head model is determined using the detection and then projection of the iris center key points. The segment height is a vertical measurement from the bottom of the lens to the center of the pupil. The temple length is a measurement from the front of the lens to the point where the temple sits on the ear juncture. The nose bridge width is the width of the user's nose bridge where the glasses are placed. All of these measurements can be accurately calculated once the 3D model of a glasses frame is placed/fitted on the scaled 3D model of the user's head since the scaled 3D model of the user's head has already been accurately scaled. The measurements described in more detail below with reference to FIGS. 6A-6C.

At step 514, at least some of the facial measurements that are derived from fitting a 3D model of a glasses frame onto the scaled 3D model of a user's head are assigned a corresponding confidence level or another classification of accuracy. For example, the system can assign a confidence level (or other accuracy classification) to single or dual PD measurements. In some embodiments, the confidence level estimation (or other accuracy classification) is a machine learning approach which assigns either a confidence level or an accurate/inaccurate label to a facial measurement that is derived using at least the scaled 3D model of the user's head. This machine learning approach uses different features in order to make this assignment. Examples of features that are used by the machine learning approach for confidence level assignment include the pose of the user's head on the frontal image, the confidence on the key point detections of the reference object, and the confidence level to the reference 3D object model reconstruction.

In some embodiments, the facial measurements derived from the scaled 3D model of the user's head can be used to recommend products to the user. For example, at step 516 the derived facial measurements (e.g., segment height, temple length, single/dual PD, face width, and nose bridge width) can be compared against the real-life dimensions of glasses frames in a database. In some embodiments, at step 518, the recommendations of products (e.g., of glasses frames) can be generated using machine learning. For example, as an option, the user's derived facial measurements can be input to a machine learning based glasses frame recommendation model and the machine learning based glasses frame recommendation model can output best matching glasses frames. At step 520, the glasses frames with dimensions that best fit/correspond to the user's derived facial measurements can be output, at a user interface, as recommended products for the user to try on and/or purchase.

Figures 6A, 6B:
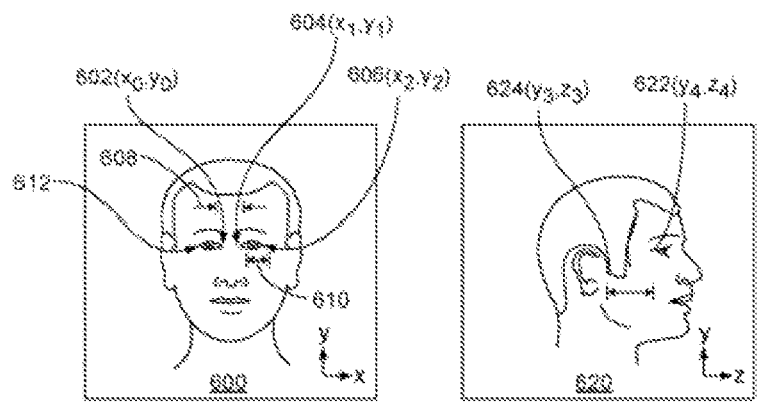
FIG. 6A illustrates an example of reference points obtained from a set of images/video frames of the user's head, according to an embodiment.
FIG. 6B illustrates an example of reference points obtained from a set of profile images/video frames of the user's head, according to an embodiment.

FIG. 6A and FIG. 6B illustrate an example of reference points obtained from a set of image/video frames of the user's head. The reference points can then be used to generate an initial 3D model. FIG. 6A shows image/video frame 600, where the user is in the front orientation and reference point 602 is at the inside corner of the user's right eye, which is assigned coordinates (x0, y0). Reference points of the eye may also include inside left eye reference point 604 with coordinates (x1, y1) and outside left eye reference point 606 with coordinates (x2, y2). From the two reference points inside right eye 602 and inside left eye 604, a bridge distance 608 can be determined. In some embodiments, a lens distance can be determined using inside left eye reference point 604 and outside left eye reference point 606. FIG. 6B shows another orientation, right profile 620, with outside right eye reference point 622 with coordinates (y4, z4) and top point where the helix joins the head reference point 624 with coordinates (y3, z3). From the profile pictures, the z coordinate can be added to the initial 3D model. From the two-dimensional video frames of the user's head, the 3D model of the user's head can be determined.

Reference points can be obtained from images/video frames of the different orientations. In some embodiments, a best image/video frame for each of the orientations is selected to be used in determining reference points and user head measurements that can be at least in part used to generate the initial 3D model, as shown in FIGS. 6A and 6B. For example, the best image/video frame out of the front orientation is the image/video frame in the front facing orientation with the maximum distance between the endpoints of the eyes. For example, the image/video frame with the largest distance between the right eye and the right ear is determined as the best right profile. Other embodiments for the selection of the best image/video frames include machine learning or various heuristics for certain models that best fit a certain orientation.

Figure 6C:
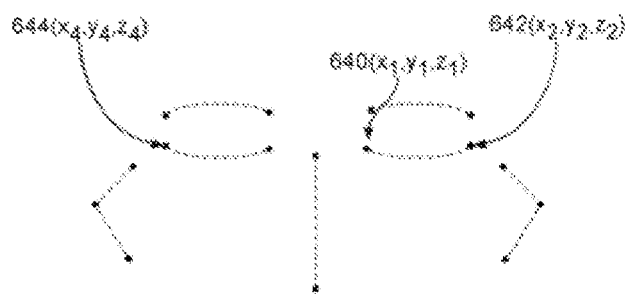
FIG. 6C is a diagram illustrating the initial 3D model comprising a set of reference points, according to an embodiment.

FIG. 6C is a diagram illustrating an embodiment of the initial 3D model comprising a set of reference points. In some embodiments, reference points from the 2D images/video frames can be combined to make the 3D model of FIG. 6C. The corresponding reference points are combined to make a set of (x,y,z) coordinates representing the position of each of the reference points on the user's head. For example, the (x,y) coordinates of the outside corner of the right eye 612 from the front orientation video frame 600 could be combined with the z coordinate of the outside right eye reference point 622 in the right orientation image/video frame 620 to obtain the reference point 644 with coordinates (x4, y4, z4). The set of (x,y,z) coordinates comprise a portion of the initial 3D model. As shown in the dashed lines of FIG. 6C, the points in the initial 3D model, can be used to generate a representational image of a user's face.

In some embodiments, the initial 3D model includes an average of reference points in 3D space from a set of users. Using a set of users instead of just the user's face, a generic face is used as the initial 3D model. Instead of generating the initial 3D model from the reference points of the user's head, the generic 3D model is used as a starting point and then adjusted. In some embodiments, the generic 3D model does not include the user's reference points, but is from previous users of the system and/or a predetermined generic model. In some embodiments, the reference points from the user's head are averaged with other users to at least in part generate an initial 3D model. Furthermore, as noted above, the initial 3D model can be used to simultaneously generate the 3D model of the reference object so that the position and orientation of the reference object can be determined and the appropriate scale can be applied to the 3D model to create an improved and more accurate 3D model for the virtual try-on of glasses or other products.

As used herein, the term "about" or "substantially" refers to an allowable variance of the term modified by "about" or "substantially" by ±10% or ±5%. Further, the terms "less than," "or less," "greater than," "more than," or "or more" include, as an endpoint, the value that is modified by the terms "less than," "or less," "greater than," "more than," or "or more."

While various aspects and embodiments have been disclosed herein, other aspects and embodiments are contemplated. The various aspects and embodiments disclosed herein are for purposes of illustration and are not intended to be limiting.

What is claimed is:

1. A system, comprising:
a memory including instructions; and
a processor, when accessing the instructions, is configured to:
obtain a set of images that shows a user's head and a reference object;
generate a user's head model based at least in part on the set of images;
generate a reference object model based at least in part on the set of images;
determine an orientation and a size of the reference object model based at least in part on a location of the reference object relative to the user's head in the set of images;
use the reference object model, the orientation of the reference object model, the size of the reference object, and a known dimension of the reference object to determine scaling information;
apply the scaling information to the user's head model to obtain a scaled user's head model; and
wherein to determine the orientation of the reference object model, the processor is further configured to:
generate a facial feature model of a portion of the user's head corresponding to the location of the reference object relative to the user's head in the set of images; and
determine the orientation of the reference object model using the facial feature model of the portion of the user's head.

2. The system of claim 1, wherein:
the set of images comprises a first set of images;
the processor is further configured to receive a second set of images that shows the user's head but not the reference object; and
the user's head model is further generated based at least in part on the second set of images.

3. The system of claim 1, wherein the reference object is associated with a standard size or known dimensions.

4. The system of claim 1, wherein the location of the reference object relative to the user's head in the set of images is predetermined.

5. The system of claim 1, wherein the processor is further configured to determine a location of the reference object in at least one image of the set of images.

6. The system of claim 1, wherein the processor is further configured to determine a key facial point in at least one image of the set of images.

7. The system of claim 1, wherein the user's head model and the reference object model are in the same coordinate system.

8. The system of claim 1, wherein the processor is further configured to:
place a glasses frame model on the scaled user's head model; and
use stored measurement information associated with the glasses frame model and the placement of the glasses frame model on the scaled user's head model to determine a set of facial measurements associated with the user's head.

9. The system of claim 8, wherein the processor further configured to determine a respective confidence level or a classification of accuracy corresponding to at least one facial measurement.

10. The system of claim 8, wherein the processor is further configured to:
compare the set of facial measurements to stored dimensions of a set of glasses frames; and
output one or more recommended glasses frames at a user interface based at least in part on the comparisons.

11. The system of claim 8, wherein the processor is further configured to:
input the set of facial measurements to a machine learning based model to obtain a set of recommended glasses frames; and
output the set of recommended glasses frames at a user interface.

12. A method for scaling a captured image of a user's head, comprising:
obtaining a set of images that shows a user's head and a reference object;
generating a user's head model based at least in part on the set of images;
generating a reference object model based at least in part on the set of images;
generating a facial feature model of a portion of the user's head corresponding to the location of the reference object relative to the user's head in the set of images;
determining the orientation of the reference object model using the facial feature model of the portion of the user's head;
determining an orientation and a size of the reference object model based at least in part on a location of the reference object relative to the user's head in the set of images;
using the reference object model, the orientation of the reference object model, the size of the reference object, and a known dimension of the reference object to determine scaling information; and
applying the scaling information to the user's head model to obtain a scaled user's head model.

13. The method of claim 12, wherein:
the set of images comprises a first set of images;
the method further comprises receiving a second set of images that shows the user's head but not the reference object; and
generating the user's head model based at least in part on the second set of images.

14. The method of claim 12, wherein the reference object is associated with a standard size or known dimensions.

15. The method of claim 12, wherein the user's head model and the reference object model are in the same coordinate system.

16. The method of claim 12, further comprising:
placing a glasses frame model on the scaled user's head model; and
using stored measurement information associated with the glasses frame model and the placement of the glasses frame model on the scaled user's head model to determine a set of facial measurements associated with the user's head.

17. The method of claim 12, further comprising inputting a set of facial measurements to a machine learning based model to obtain a set of recommended glasses frames.

* * * * *